United States Patent
Häfele et al.

Patent Number: 5,718,299
Date of Patent: Feb. 17, 1998

[54] DRIVE DEVICE FOR AGRICULTURAL HARVESTORS

[75] Inventors: Martin Häfele, Hüttlingen; Hermann Berghorn, Wittislingen, both of Germany

[73] Assignee: Same S.p.A., Treviglio, Italy

[21] Appl. No.: 765,044

[22] PCT Filed: Jul. 12, 1995

[86] PCT No.: PCT/EP95/02714
§ 371 Date: Dec. 10, 1996
§ 102(e) Date: Dec. 10, 1996

[87] PCT Pub. No.: WO96/01746
PCT Pub. Date: Jan. 25, 1996

[30] Foreign Application Priority Data

Jul. 12, 1994 [DE] Germany ............ 44 24 442.8

[51] Int. Cl.⁶ .................................. B60K 17/00
[52] U.S. Cl. .................. 180/53.4; 180/305; 180/306; 74/15.4; 74/718; 74/15.6
[58] Field of Search .................. 180/305, 306, 180/307, 53.4, 53.1, 53.62; 74/15.4, 15.6, 15.63, 15.66, 718

[56] References Cited

U.S. PATENT DOCUMENTS

| | | |
|---|---|---|
| 4,440,416 | 4/1984 | Claas et al. ............ 180/53.62 |
| 4,691,802 | 9/1987 | Ishimori et al. ............ 180/306 |
| 4,727,759 | 3/1988 | Yamaoka et al. ............ 74/15.2 |

FOREIGN PATENT DOCUMENTS

| | | |
|---|---|---|
| 406161 | 11/1966 | Australia. |
| 0656315 | 6/1995 | European Pat. Off.. |
| 2184360 | 11/1973 | France. |
| 3446271 | 7/1985 | Germany. |
| 3511370 | 10/1985 | Germany. |
| 887551 | 1/1962 | United Kingdom. |

*Primary Examiner*—Richard M. Camby
*Attorney, Agent, or Firm*—Hardaway Law Firm, P.A.; Charles L. Schwab

[57] ABSTRACT

The drive device for an agricultural harvester includes a gear unit (5) driven by an internal combustion engine through a hydrostatic transmission comprised of a hydraulic pump (1) and a hydraulic motor (2). The transmission unit (5) drives a pair of drive wheels (12) through the differential (8). A power takeoff device (13) is installed between the hydraulic motor (2) and the transmission unit (5) and a clutch is installed between the power takeoff device (13) and the transmission unit (5) thus permitting operation of the power takeoff device while power to the drive wheels is disconnected. A brake (4) is provided on the transmission unit and a brake is provided for each of the drive wheels (12).

7 Claims, 1 Drawing Sheet

DRIVE DEVICE FOR AGRICULTURAL HARVESTORS

TECHNICAL FIELD

This invention relates to a drive device for agricultural harvesters which includes a power takeoff upstream of a transmission unit and a clutch downstream of the power takeoff and upstream of the transmission unit.

BACKGROUND OF THE INVENTION

The Vogel Technical Book series "Agricultural Engineering" titled Encyclopedia of Agricultural Engineering, by Robert Fritz Kuntze (First Edition, 1987) on pages 70 and 71 describes drive trains for combines in which power is conveyed from an internal combustion engine (diesel engine), via a hydraulic pump, to a hydraulic motor, which acts on the driving wheels of the agricultural harvester via at least one gear unit. Information on brakes and drives for further devices of the agricultural harvester cannot be found in this prior art.

Great Britain patent GB-A-912,109 shows a tractor drive train for the drive wheels which includes a differential having a decoupling feature.

U.S. Pat. No. 2,158,483 shows two power takeoff shafts at right angles to one another and driven by an angular gear unit.

OBJECTS AND SUMMARY OF THE INVENTION

It is an object of the invention to create a drive device for an agricultural harvester that is simply constructed in terms of design and provides a problem-free drive for further devices of the agricultural harvester.

This object is achieved by use of a power takeoff in the drive train for the driving of further devices of the agricultural harvester. A clutch is provided downstream of the power takeoff by which the drive to the driving wheels can be engaged or disengaged. This arrangement has the advantage that only a single drive (prime mover) is required both for the driving of the agricultural harvester itself and also for further devices of the harvester. The power takeoff is provided so that this drive can operate in problem-free fashion, a clutch being arranged in the drive train downstream of the power takeoff, with which clutch the drive to the driving wheels can be engaged or disengaged so that the drive of the harvester can be operated independently of the further devices and/or the other way around. Thus it is conceivable, for example, that the further devices are still driven while the movement of the harvester is halted, so that the processing operation taking place in the harvester can continue. This structure, moreover, has the advantage that a commercially available transmission must be supplemented only by the power takeoff and the clutch, so that the drive device according to the invention also represents an economical solution. Since commercially available and standard transmissions have been proven in practical applications, the supplementation according to the invention is also simple in terms of design and is problem-free.

In development of the invention, in order to enhance the efficiency, a clutch is placed downstream of the power takeoff by which the further devices can be engaged or disengaged. The supplementation of such a clutch has the advantage that the drive possibilities are augmented because, first, the drive to the driving wheels can be engaged or disengaged and, second, the drive for the further devices of the harvester can be engaged or disengaged. In this way, depending on the operating conditions of the agricultural harvester, the possibilities exist that both the driving wheels and also the further devices are driven, that only the driving wheels or only the further devices are driven, or that the driving wheels are halted and also the further devices are disengaged so that the prime mover is in a quasino-load condition.

In development of the invention, the clutch arranged in the drive train is made as a non-positively operating clutch and/or the clutch arranged upstream of the further devices is made as a positively operating clutch. This has the advantage that the individual components (drive of the driving wheels and drive of the further devices) can be optimally engaged in the drive train or disengaged from the drive train, depending on their design features and their intended purpose, so that the most wear-free operation possible is insured for these components.

In development of the invention, the power takeoff is made as an angular gear. In this way, a power takeoff is obtained that operates in problem-free fashion and is simple to realize in terms of design. Furthermore, this angular gear is easy to integrate in the substantially longitudinally extending drive device (in particular, beneath an operator cab of the agricultural harvester), which is located in the region of the drive axis, and permits direct driving of the further devices.

In development of the invention, the prime mover is an internal combustion engine (preferably diesel engine) having a downstream hydraulic pump that drives a hydrostatic transmission. This combination has the advantage that it has been proven in practice and represents a hydrostatic drive with which the driving (speed) of the harvester can be easily varied, so that costly change gears become unnecessary. Furthermore, the arrangement of the power takeoff in the drive train has the advantage that, upon a variation of the hydrostatic drive, which results in a change in the speed of the harvester, the processing speed of the further device is also adapted to the travel speed of the harvester. On the other hand, it is possible to let the further devices continue to run, for example when the machine is halted, so that the processing operation continues with the machine halted. At least one gear unit can also be positioned downstream of the power takeoff in the direction of the further device. Further power takeoffs, further clutches or flywheels can also be attached here.

In further development of the invention, the drive from the prime mover may be reversed in its rotation direction at least briefly after the clutch arranged in the drive train is disengaged. This has the advantage that after the drive of the harvester is disengaged, the drive of the further devices is reversed so that, for example in the case of a malfunction or plugging of one of the further devices, this malfunction or plugging can be remedied by means of the reversal of rotation direction. This can easily be initiated, for example, by an operator of the harvester pressing a button. It must be made certain, however, that the clutch located in the drive train is disengaged first before the reversal of rotation direction.

BRIEF DESCRIPTION OF THE DRAWINGS

One embodiment of the invention is illustrated schematically in FIG. 1.

DETAILED DESCRIPTION OF THE DRAWINGS

Figure 1:
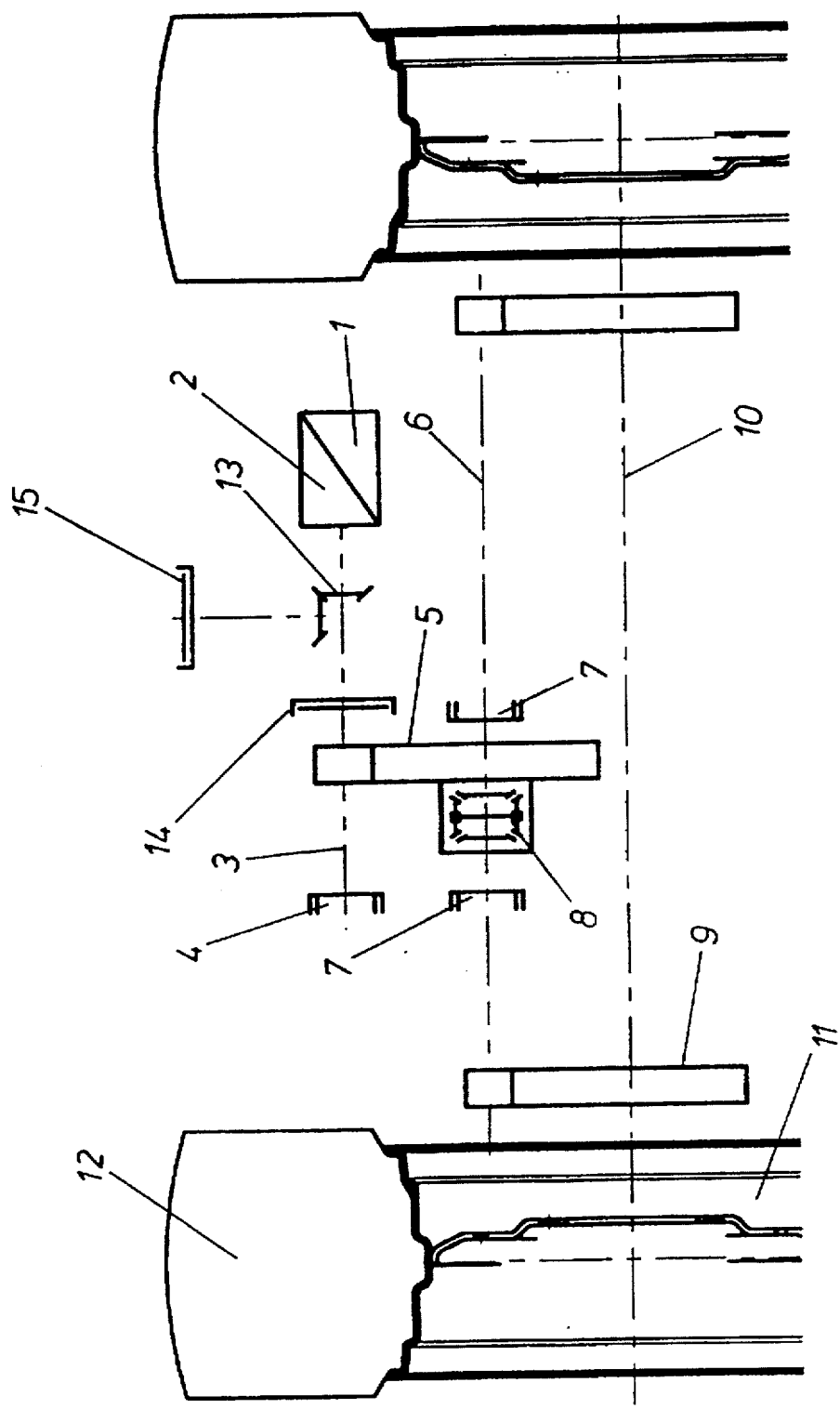

FIG. 1 shows a drive device made according to the invention for an agricultural harvester. This drive device has a hydrostatic transmission which includes a hydraulic pump 1 and a hydraulic motor 2, the hydraulic pump 1 being driven by an internal combustion engine, not illustrated. The hydraulic motor 2 drives a shaft 3 to which a parking brake 4 is connected. The parking brake may be actuated when the harvester is halted. A gear unit 5, which is made according to the invention as a simple reduction gear unit, is driven via the shaft 3. The output side of this gear unit 5 includes a differential 8 driving a pair of jack shafts 6, on which service brakes 7 (for example disk brakes that can be actuated during the operation of the harvester) are arranged. The differential allows unequal peripheral speeds of the driving wheels. As is shown in FIG. 1, the shafts 6 drive a pair of simple reduction gear units 9 which in turn drive shafts 10 on which the driving wheels, in the form of rims 11 and tires 12, are arranged. In this way there is created a drive device for agricultural harvesters that has components which have been proven in practice, operates reliably and can be fabricated at low cost, especially in the mass production of agricultural harvesters. According to the invention, this drive device is now supplemented in that a power takeoff in the form of an angular gear 13 is arranged in the drive train. Further, as can be recognized in FIG. 1, a clutch 14, which in particular operates in non-positive fashion, is assigned to the angular gear 13 in the drive train. With this clutch 14, the drive of the hydraulic motor 2 to the driving wheels (rims 11 and tires 12) can be engaged or disengaged. Downstream of the angular gear 13 there is a clutch 15, in particular acting in positive fashion, via which the further devices (not illustrated) can be engaged or disengaged. In this way, the drive of the agricultural harvester and the drive of the further devices integrated in the agricultural harvester can be driven independently or dependently according to the service condition. In order to realize the most compact construction possible for the drive device made according to the invention, the power take off (angular gear 13) is arranged in the immediate vicinity of the hydraulic motor 2 or on the hydraulic motor 2.

The drive device made according to the invention finds use in agricultural harvesters generally. A particular field of application is combine harvesters, where the further devices of the combine harvester are, for example, threshing, shaking, screening, cutting and pick-up devices. A further field of application is harvesters for forage processing, where the further devices are then cutting, conveying, processing, baling and discharge devices. Self-propelled large balers as harvesters can be cited as a third field of application, where the further devices are pick-up or baling and discharge devices for the large bales. The making according to the invention is obviously not restricted to the three harvesters named but can also be extended to further fields of application (generally to agricultural or farm vehicles) and also to other types of agricultural harvesters (for example field choppers).

What is claimed is:

1. In a self-propelled harvester having an internal combustion engine and a pair of driving wheels (11,12), a driving device comprising:

a hydrostatic transmission including
      a hydraulic pump (1) non-positively connected in driven relation to said internal combustion engine and
      a hydraulic motor (2) driven by said hydraulic pump (1),
   at least one reduction gear unit (5);
   a first torque transmitting means connecting said hydraulic motor to said reduction gear unit,
   a second torque transmitting means between said one reduction gear unit and said driving wheels including a differential between said driving wheels,
   a power takeoff connected in driven relation to said first torque transmission means and
   a main clutch in said first torque transmitting means between said one reduction gear unit and the connection between said power takeoff and said first torque transmitting means, said main clutch being operable to interrupt torque transmission to said one reduction gear unit.

2. The harvester of claim 1 and further comprising an auxiliary clutch (15) downstream of said auxiliary device by which further devices may be engaged or disengaged.

3. The harvester of claim 2 wherein said main clutch is a non-positively acting clutch and said auxiliary clutch is a positively acting clutch.

4. The harvester of claim 1 wherein said power takeoff is a bevel gear (13).

5. The harvester of claim 1 and further comprising a parking brake (4) downstream of said main clutch (14) and upstream of said differential (8).

6. The harvester of claim 5 and further comprising a wheel brake (7) for each of said driving wheels (11, 12).

7. The harvester of claim 1 and further comprising a wheel brake (7) for each of said driving wheels (11, 12).

* * * * *

UNITED STATES PATENT AND TRADEMARK OFFICE
CERTIFICATE OF CORRECTION

PATENT NO. : 5,718,299

DATED : February 17, 1998

INVENTOR(S) : Martin Hafele and Herman Berghorn

It is certified that error appears in the above-identified patent and that said Letters Patent is hereby corrected as shown below:

On title page,

In item [73] on the cover page cancel "SAME S.p.A" and substitute ---SAME DEUTZ-FAHR S.p.A.---.

Signed and Sealed this

Third Day of November, 1998

Attest:

BRUCE LEHMAN

Attesting Officer

Commissioner of Patents and Trademarks